United States Patent
Yang et al.

(10) Patent No.: US 8,077,385 B2
(45) Date of Patent: Dec. 13, 2011

(54) RECONFIGURABLE OPTICAL AMPLIFIER, REVERSIBLE OPTICAL CIRCULATOR, AND OPTICAL SIGNAL TRANSMISSION SYSTEM

(75) Inventors: Chun-Liang Yang, Taipei County (TW); Dar-Zu Hsu, Tainan County (TW); San-Liang Lee, Taipei (TW); Jian-Ting Hong, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 411 days.

(21) Appl. No.: 12/475,614

(22) Filed: Jun. 1, 2009

(65) Prior Publication Data

US 2010/0103506 A1    Apr. 29, 2010

(30) Foreign Application Priority Data

Oct. 28, 2008    (TW) ................................. 97141458 A

(51) Int. Cl.
*H01S 4/00* (2006.01)
*H04B 10/12* (2006.01)
*G02B 27/28* (2006.01)

(52) U.S. Cl. ............... 359/349; 359/484.05; 359/484.06
(58) Field of Classification Search .................. 359/349, 359/484.05, 484.06
See application file for complete search history.

(56) References Cited

U.S. PATENT DOCUMENTS

| | | | | |
|---|---|---|---|---|
| 5,548,438 | A | * | 8/1996 | Delavaux .................. 359/341.2 |
| 5,838,477 | A | * | 11/1998 | Yamamoto et al. ........... 398/105 |
| 5,923,472 | A | * | 7/1999 | Bergmann .................... 359/618 |
| 5,982,539 | A | | 11/1999 | Shirasaki |
| 6,002,512 | A | | 12/1999 | Bergmann et al. |
| 6,088,491 | A | | 7/2000 | Sorin et al. |
| 6,101,026 | A | | 8/2000 | Baney |
| 6,188,810 | B1 | * | 2/2001 | Baney ............................. 385/11 |
| 6,212,000 | B1 | * | 4/2001 | Ishikawa .................... 359/341.1 |
| 6,377,393 | B1 | | 4/2002 | Saeki |
| 7,050,232 | B2 | | 5/2006 | Wada et al. |
| 2001/0038478 | A1 | * | 11/2001 | Hwang ......................... 359/124 |
| 2005/0089263 | A1 | * | 4/2005 | Wessel et al. ................... 385/14 |

FOREIGN PATENT DOCUMENTS

JP    06077570 A    *    3/1994

* cited by examiner

*Primary Examiner* — Eric Bolda
(74) *Attorney, Agent, or Firm* — Jianq Chyun IP Office

(57) ABSTRACT

A reconfigurable optical amplifier including a first reversible optical circulator and an optical gain device is provided. The first reversible optical circulator has four I/O ports which are respectively referred to as a first terminal, a second terminal, a third terminal, and a fourth terminal. The four I/O ports sequentially transmit an optical signal in a transmission direction of a forward circulation or a backward circulation according to a control signal. The first terminal is isolated from the adjacent fourth terminal. The optical gain device is connected between the first terminal and the adjacent fourth terminal. The second terminal and the third terminal are respectively connected to a first communication node and a second communication node.

20 Claims, 10 Drawing Sheets

US 8,077,385 B2

RECONFIGURABLE OPTICAL AMPLIFIER, REVERSIBLE OPTICAL CIRCULATOR, AND OPTICAL SIGNAL TRANSMISSION SYSTEM

CROSS-REFERENCE TO RELATED APPLICATION

This application claims the priority benefit of Taiwan application serial no. 97141458, filed Oct. 28, 2008. The entirety of the above-mentioned patent application is hereby incorporated by reference herein and made a part of specification.

BACKGROUND OF THE INVENTION

1. Field of the Invention

The present invention relates to a reconfigurable optical amplifier and applications thereof.

2. Description of Related Art

Optical communication techniques have been broadly applied to ultra-wideband networks, wherein reversible three-port or four-port optical circulators are usually used as unidirectional 1×2 and 2×2 optical switches. In addition, optical amplifiers composed of optical circulators with fixed transmission directions and optical gain devices are usually disposed on optical transmission paths for amplifying optical signals and providing network monitoring signal return paths. A conventional optical amplifier has a unidirectional design, and therefore is limited in network applications.

FIG. 1 is a schematic diagram of a conventional optical communication network. Referring to FIG. 1, in the conventional optical communication network, a two-way transmission is established between two communication nodes 80 and 90. The communication node 80 has a receiver Rx1 and a transmitter Tx1, and the communication node 90 has a receiver Rx2 and a transmitter Tx2 respectively connected to the transmitter Tx1 and the receiver Rx1. Taking that the communication node 80 transmits an optical signal to the communication node 90 as an example, the communication path is connected to the receiver Rx2 of the communication node 90 through an optical switch 100, a unidirectional optical amplifier (OA) 102, an optical fiber path 104, a unidirectional optical amplifier 106, and an optical switch 108.

However, the optical fiber path 104 may be broken due to some external factors. Thus, a protection path 120 has to be disposed, and the optical signal can be transmitted through the protection path 120 through the switching of the optical switches 100 and 108. The protection path 120 is the same as a normal path but only served as a backup path.

Similarly, when the communication node 90 transmits an optical signal to the receiver Rx1 of the communication node 80, the communication path is connected to the receiver Rx1 of the communication node 80 through an optical switch 110, a unidirectional optical amplifier 112, an optical fiber path 114, a unidirectional optical amplifier 116, and an optical switch 118. The backup protection path 122 has the same function as the protection path 120 but a reverse transmission direction. Because optical amplifiers are usually used in unidirectional transmission only, two protection paths 120 and 122 have to be disposed. As a result, the cost of the conventional optical communication network is very high.

Even though many different designs have been provided, a more satisfactory optical communication technique is still desired.

SUMMARY OF THE INVENTION

Consistent with the invention, there is provided a reconfigurable optical amplifier including a first reversible optical circulator and an optical gain device. The first reversible optical circulator has four I/O ports which are respectively a first terminal, a second terminal, a third terminal, and a fourth terminal. The four I/O ports sequentially transmit a first optical signal in a first transmission direction of a forward circulation or a backward circulation according to a control signal. The first terminal is isolated from the adjacent fourth terminal. The optical gain device is connected between the first terminal and the adjacent fourth terminal. The second terminal and the third terminal are respectively connected to a first communication node and a second communication node.

Consistent with the invention, there is provided a reversible optical circulator including an optical circulator and a magnetic field control device. The optical circulator has four I/O ports which are respectively a first terminal, a second terminal, a third terminal, and a fourth terminal, wherein an internal magnetic unit of the optical circulator is made of a semi-hard magnetic material. The magnetic field control device generates a first direction magnetic field or a second direction magnetic field according to a control signal and supplies the first direction magnetic field or the second direction magnetic field to the optical circulator to change a magnetic polarity, so that the first terminal, the second terminal, the third terminal, and the fourth terminal sequentially transmit an optical signal in a transmission direction of a forward circulation or a backward circulation, wherein the first terminal is isolated from the fourth terminal.

Consistent with the invention, there is provided an optical signal transmission system including a first communication terminal, a second communication terminal, an optical first path, an optical second path, and a protection path. The first communication terminal has a first optical switch unit connected to a first receiver and a first transmitter. The second communication terminal has a second optical switch unit connected to a second receiver and a second transmitter. The optical first path is connected between the first receiver and the second transmitter through the first optical switch unit and the second optical switch unit. The optical second path is connected between the first transmitter and the second receiver and/or between the second receiver and the first transmitter through the first optical switch unit and the second optical switch unit. The protection path is connected between the first receiver and the second transmitter through the first optical switch unit and the second optical switch unit, and the protection path includes at least one reconfigurable optical amplifier. The reconfigurable optical amplifier includes a first reversible optical circulator and an optical gain device. The first reversible optical circulator has four I/O ports which are respectively a first terminal, a second terminal, a third terminal, and a fourth terminal. The four I/O ports sequentially transmit a first optical signal in a first transmission direction of a forward circulation or a backward circulation according to a control signal. The first terminal is isolated from the adjacent fourth terminal. The optical gain device is connected between the first terminal and the adjacent fourth terminal. The second terminal and the third terminal are respectively connected to a first node and a second node, wherein the first node and the second node are respectively connected to the first communication terminal and the second communication terminal either directly or through a second reversible optical circulator.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments consistent with the present invention, there is provided a reconfigurable optical amplifier, wherein a reversible optical circulator is adopted to allow an optical transmission path to be reversible, and an optical gain device is also adopted. As a result, the number of protection paths in an optical communication network is reduced and accordingly the design of the optical communication network is simplified.

Figure 1:
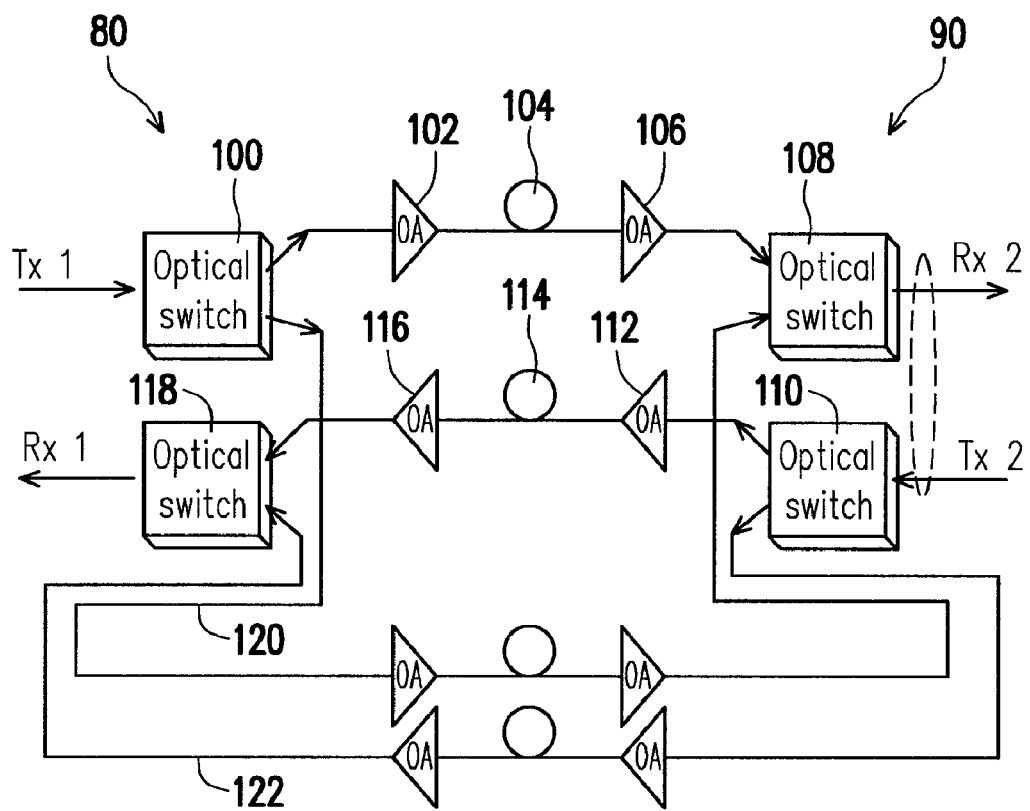
FIG. 1 is a schematic diagram of a conventional optical communication network.
Figure 2A:
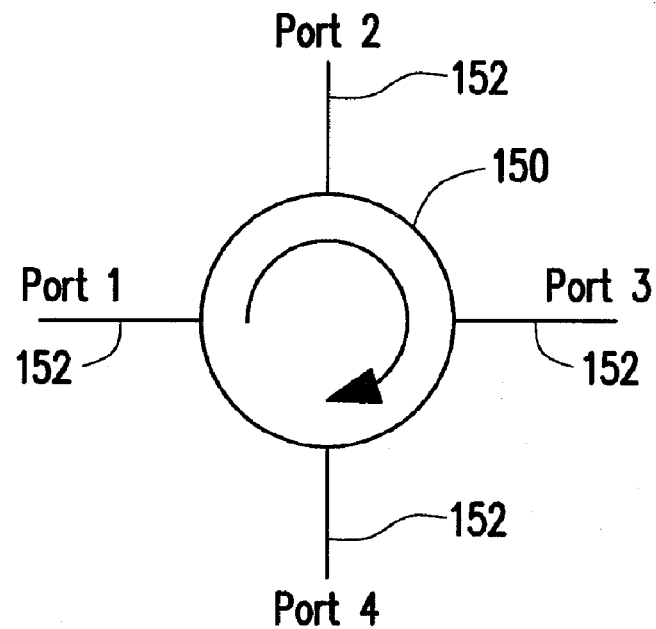
FIG. 2A and FIG. 2B are state diagrams of a reversible optical circulator according to an exemplary embodiment consistent with the present invention.
Figure 2B:
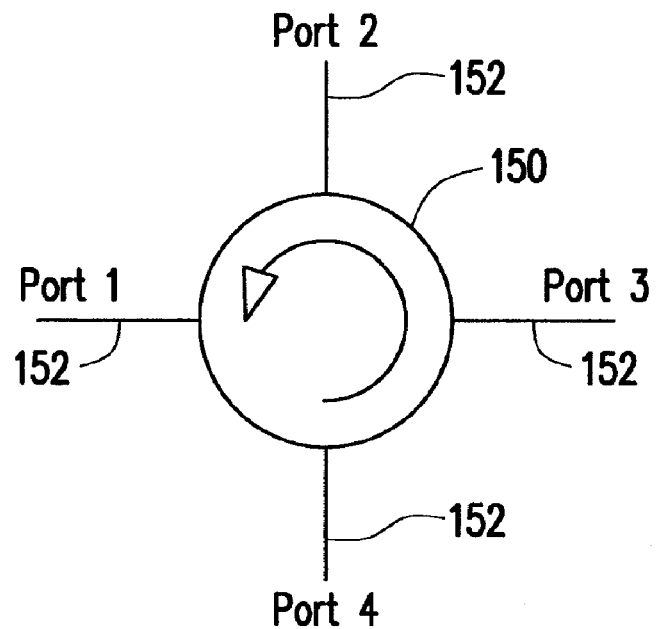

FIG. 2A and FIG. 2B are state diagrams of a reversible optical circulator according to an embodiment of the present invention. All the optical circulators adopted in the present invention are the reversible optical circulator 150, but with a specific isolated position. Taking the reversible optical circulator 150 having four I/O ports 152 (port 1-port 4) as an example, the reversible optical circulator 150 may be in a clockwise forward circulation as denoted by the solid arrow in FIG. 2A or an anti-clockwise backward circulation as denoted by the hollow arrow in FIG. 2B. However, regardless of forward circulation or backward circulation, the port 1 and the adjacent port 4 are isolated from each other, as denoted by the gap on the arrow. It should be noted that the sequence of the four I/O ports 152 is not limited herein, and it is within the scope of the present invention as long as the same section is isolated in both the forward circulation and the backward circulation.

Regarding the sequence illustrated in FIG. 2A, a signal input from the port 1 is sequentially output from the next I/O port, namely, the port 2. A signal input from the port 2 is sequentially output from the next I/O port, namely, the port 3. A signal input from the port 3 is sequentially output from the next I/O port, namely, the port 4. However, a signal input from the port 4 is not output or is output through an external path. The output direction in FIG. 2B is reverse to that in FIG. 2A; however, the same mechanism is adopted. The design of the reversible optical circulator 150 will be described below with reference to FIG. 4.

Figure 3:
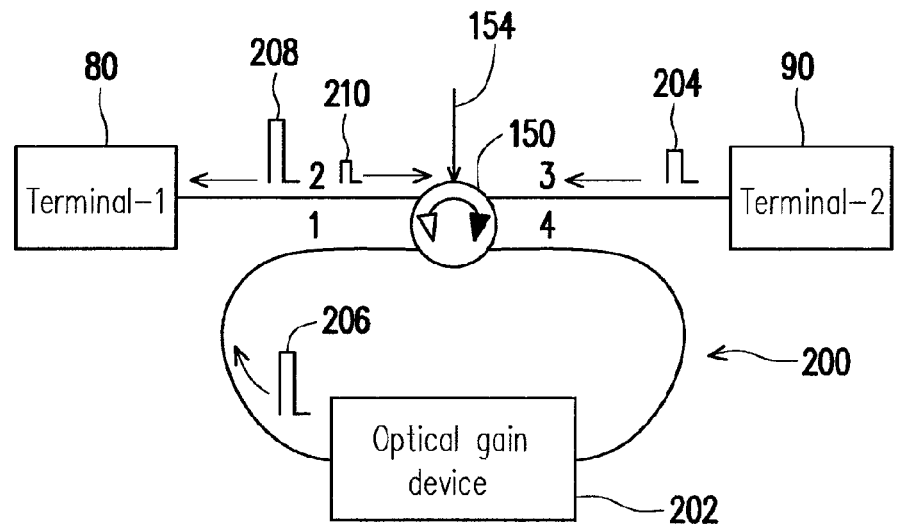
FIG. 3 is a schematic diagram of a reconfigurable optical amplifier according to an exemplary embodiment consistent with the present invention.

FIG. 3 is a schematic diagram of a reconfigurable optical amplifier according to an embodiment of the present invention. Referring to FIG. 3, the reconfigurable optical amplifier 200 has a reversible optical circulator 150 as illustrated in FIG. 2A and FIG. 2B. Generally speaking, the reconfigurable optical amplifier 200 includes the reversible optical circulator 150 and an optical gain device 202. The reversible optical circulator 150 has four I/O ports which are respectively referred to as a first terminal (1), a second terminal (2), a third terminal (3), and a fourth terminal (4). The first terminal (1), the second terminal (2), the third terminal (3), and the fourth terminal (4) of the reversible optical circulator 150 sequentially transmit an optical signal in a transmission direction of a forward circulation (as denoted by the solid arrow) or a backward circulation (as denoted by the hollow arrow), namely, in two switchable directions, according to a control signal supplied to the magnetic field control device 154. In the present embodiment, the first terminal (1) and the adjacent fourth terminal (4) are isolated from each other; however, the present invention is not limited thereto. The optical gain device 202 is connected between the first terminal (1) and the adjacent fourth terminal (4). The second terminal (2) and the third terminal (3) are respectively connected to two communication nodes 80 and 90, wherein the communication nodes 80 and 90 are respectively denoted as terminal-1 and terminal-2.

For example, an optical signal 204 is input to the third terminal (3) of the reversible optical circulator 150 from the communication node 90 (the terminal-2). The reversible optical circulator 150 is controlled to circulate clockwise. Since the first terminal (1) is isolated from the fourth terminal (4), the optical signal 204 enters the optical gain device 202 and is amplified into a signal 206, namely, the optical gain device 202 produces an optical signal gain. The signal 206 then enters the first terminal (1) of the reversible optical circulator 150 and output as a signal 208 from the second terminal (2) to the communication node 80. In addition, even though there may be a signal 210 reflected by the communication node 80 back to the second terminal (2), the reflected signal 210 will not enter the optical gain device 202 again to produce any noise.

Figure 4:
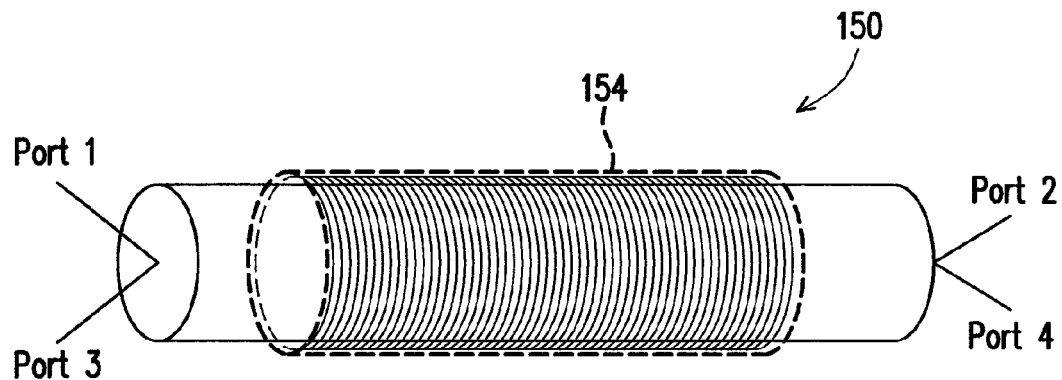
FIG. 4 is a schematic diagram of a reversible optical circulator according to an exemplary embodiment consistent with the present invention.

FIG. 4 is a schematic diagram of a reversible optical circulator according to an embodiment of the present invention. Referring to FIG. 4, the reversible optical circulator 150 includes an optical circulator and a magnetic field control device 154 controlled by a control signal. As described above, the optical circulator has four I/O ports which are respectively referred to as a first terminal (port 1), a second terminal (port 2), a third terminal (port 3), and a fourth terminal (port 4), wherein an internal magnetic unit of the optical circulator is made of a semi-hard magnetic material. The magnetic field control device 154 (for example, a coil) generates a first direction magnetic field or a second direction magnetic field according to a control signal and supplies the first direction magnetic field or the second direction magnetic field to the optical circulator to change a magnetic polarity, so that the first terminal, the second terminal, the third terminal, and the fourth terminal sequentially transmit an optical signal in a forward direction or a backward direction. Besides, the first terminal is isolated from the fourth terminal; however, the present invention is not limited thereto.

The major optical components in the optical circulator include a polarization beam splitter (PBS), a Faraday rotator, and a polarization beam combiner (PBC), and the operations of these optical components will be described below. The Faraday rotator operates according to the Faraday Magneto-optical Effect. The polarized rotation angle of the Faraday rotator changes along with the intensity of an external magnetic field, and the polarized rotation angle of an input light wave is changed by the Faraday rotator. After that, the light wave passes through the PBC and then is output to an optical fiber path. Since the input light wave is split into two light beams of TE and TM by the PBS and the polarization state of each light beam is changed by the Faraday rotator, a linear polarization filter effect is produced on the PBC and accordingly the intensity of the light wave is changed. When the polarized rotation angle of the Faraday rotator is large enough to reverse the optical transmission path in the optical circulator, the input light wave in the original direction is almost completely blocked. In other words, the optical transmission direction is reversed.

Taking a coil design as an example, the optical circulator is wrapped with a coil of an appropriate number of turns, and the coil is covered with a magneto-conductive material in order to reduce the requirement to the driving current. If a forward current pulse passes through the coil, the semi-hard magnetic material in the optical circulator induces the corresponding magnetic field and retains its magnetic force. As a result, the rotation direction of the Faraday rotator is affect so that the optical transmission direction is reversed. If a backward current pulse passes through the coil, the semi-hard magnetic material in the optical circulator induces the corresponding magnetic field and retains its magnetic force. As a result, the rotation direction of the Faraday rotator is affected so that the optical transmission direction is restored. As described above, the optical transmission direction is changed by supplying a current of different directions.

Figure 5:
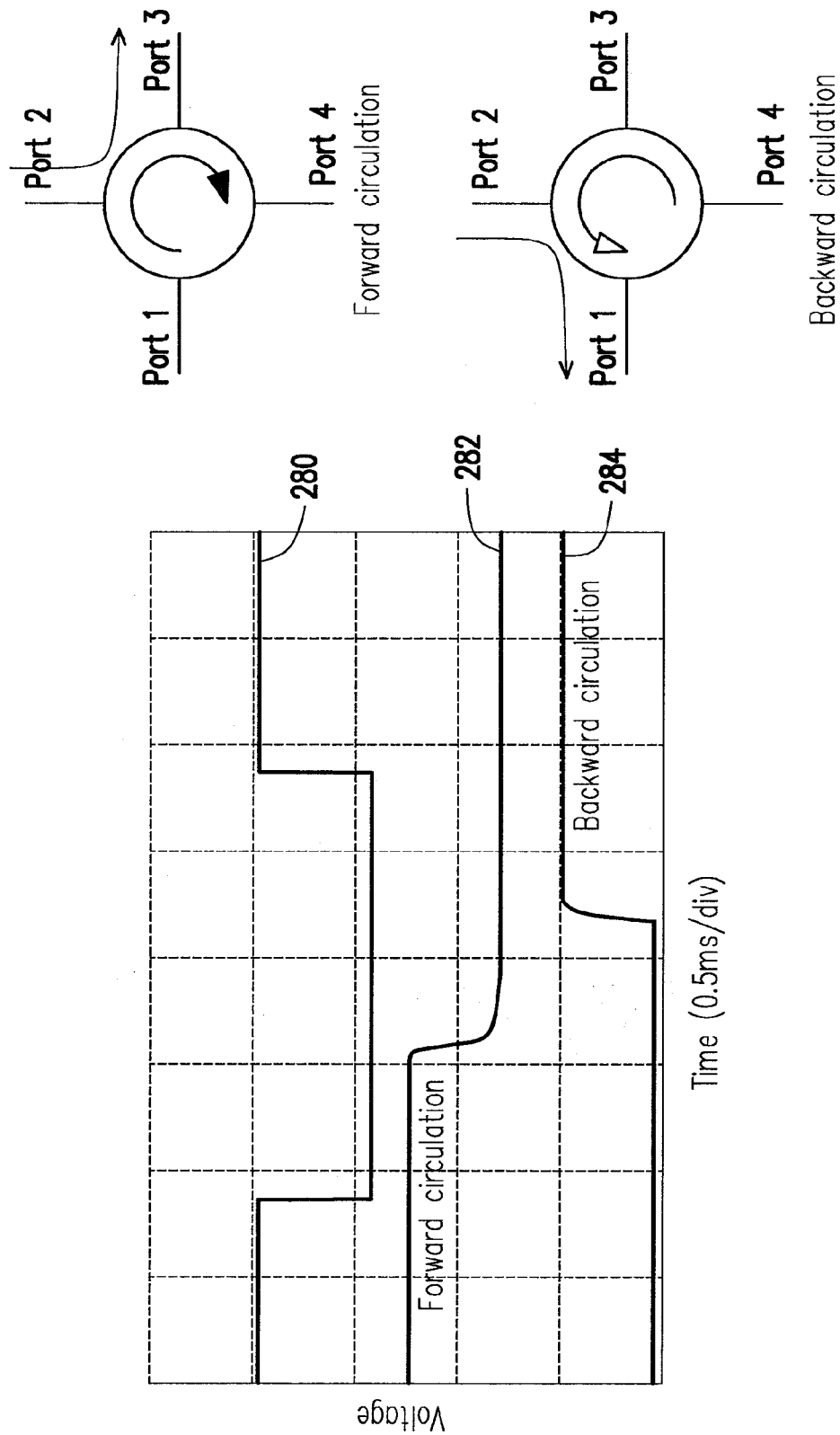
FIG. 5 is a diagram illustrating the inspection result of a trigger time according to an exemplary embodiment consistent with the present invention.

In the present embodiment, regardless of whether the optical circulator is in the forward circulation or backward circulation, the same section of the optical circulator is isolated so that a reconfigurable optical amplifier can be accomplished. Since the optical circulator has to be switched between the forward circulation and the backward circulation during the actual operation, the trigger time has to be short enough to transmit data quickly. FIG. 5 is a diagram illustrating the inspection result of the trigger time according to an embodiment of the present invention. Referring to FIG. 5, the forward circulation is inspected as a signal is transmitted from the second terminal (port 2) to the third terminal (port 3), wherein the signal 280 is a trigger signal. After the negative edge triggering the forward circulation (port 2 to port 3) is reversed at about 0.8 ms. In addition, the backward circulation is inspected as a signal is transmitted from the second terminal (port 2) to the first terminal (port 1). The backward circulation (port 2 to port 1) is started about 1.5 ms after the negative edge trigger is applied. The trigger time is also applicable.

Figure 6B:
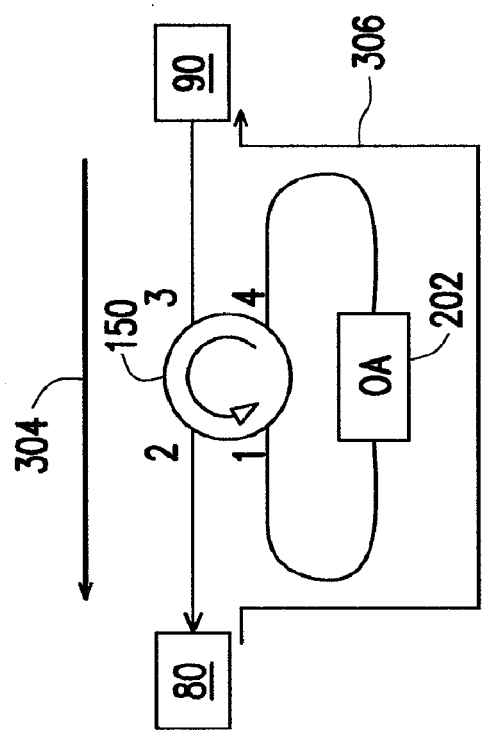
FIGS. 6A-6B are diagrams illustrating examples of different operations according to an exemplary embodiment consistent with the present invention.
Figure 6A:
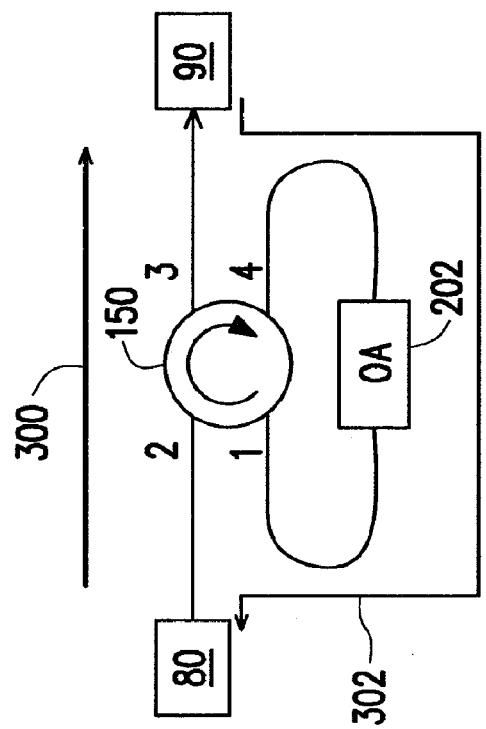

FIGS. 6A-6B are diagrams illustrating examples of different operations according to an embodiment of the present invention. Referring to FIG. 6A, the reconfigurable optical amplifier may allow an optical signal to be transmitted bi-directionally at the same time; however, the optical transmission pattern of the backward circulation can be determined according to the actual requirement. When the reversible optical circulator 150 is set to forward circulation, the optical signal is transmitted from the communication node 80 to the communication node 90 via a path 300, but the optical signal is not amplified. If the optical signal is transmitted from the communication node 90 to the communication node 80 via a path 302, the optical signal is amplified by the optical gain device 202. The optical gain device 202 is represented by OA. Referring to FIG. 6B, when the reversible optical circulator 150 is set to backward circulation, the optical signal is transmitted from the communication node 90 to the communication node 80 via a path 304, but the optical signal is not amplified. If the optical signal is transmitted from the communication node 80 to the communication node 90 via a path 306, the optical signal is amplified by the optical gain device 202.

Figure 7A:
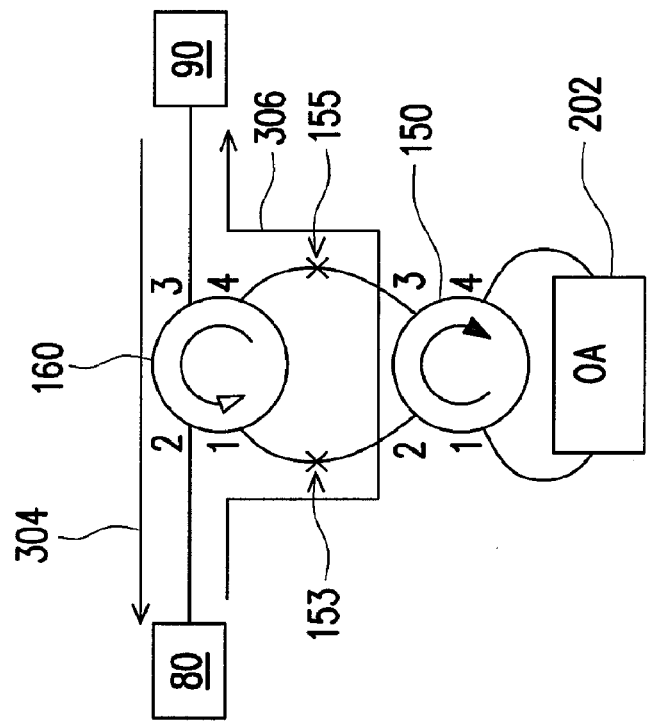
FIGS. 7A-7D are diagrams illustrating examples of different operations according to another exemplary embodiment consistent with the present invention.

FIGS. 7A-7D are diagrams illustrating examples of different operations according to another embodiment of the present invention. Referring to FIG. 7A, the reconfigurable optical amplifier may be further connected to at least another reversible optical circulator 160. The reversible optical circulator 160 has the same structure as the reversible optical circulator 150. In the present embodiment, both the two reversible optical circulators 150 and 160 are set to forward circulation. The second terminal (2) and the third terminal (3) of the reversible optical circulator 150 are respectively connected to the first terminal (1) and the fourth terminal (4) of the reversible optical circulator 160. In other words, the reversible optical circulator 150 is connected between two isolated terminals of the reversible optical circulator 160. Thus, an optical signal transmitted from the communication node 80 to the communication node 90 is transmitted via the path 300, namely, via the same path. However, the transmission path 302 of the optical signal from the communication node 90 to the communication node 80 passes through the reconfigurable optical amplifier illustrated in FIG. 6A. As can be understood, the connection between the terminals can have various manners. Here in general, a communication node 153 is indicated between the first terminal (1) of the reversible optical circulator 160 and the second terminal (2) of the reversible optical circulator 150. Likewise, the communication node 155 is also indicated between the fourth terminal (4) and the third terminal (3) of two reversible optical circulators 150, 160. The communication nodes 153, 155 are used for indicating a general connection to any other subsequently connected device without a specific manner.

Figure 7B:
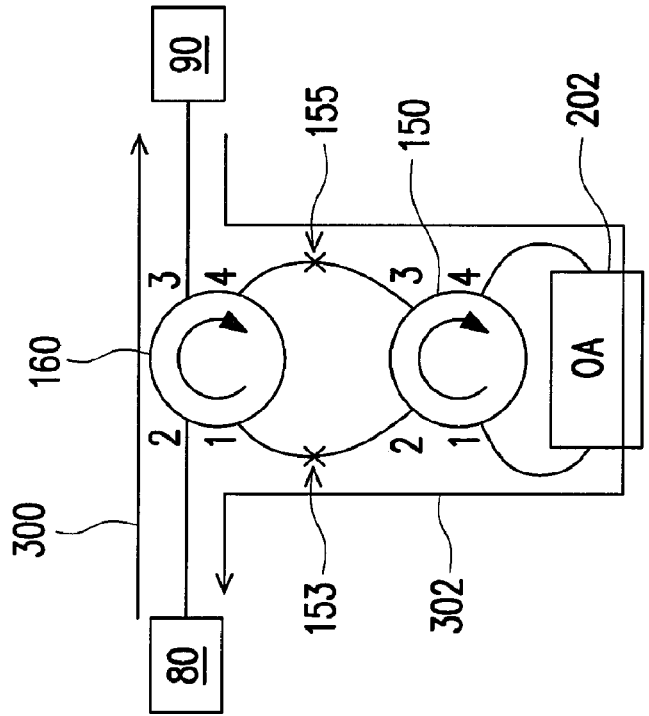

In addition, referring to FIG. 7B, the reversible optical circulator 160 is set to backward circulation. Thus, the optical signal is transmitted from the communication node 80 to the communication node 90 via the path 306, and the optical signal passes through the reversible optical circulator 150 but not the optical gain device 202. Meanwhile, the optical signal is transmitted from the communication node 90 to the communication node 80 via the path 304, and the optical signal enters the reversible optical circulator 160 through the third terminal (3) and is output to the communication node 80 from the second terminal (2).

Figure 7C:
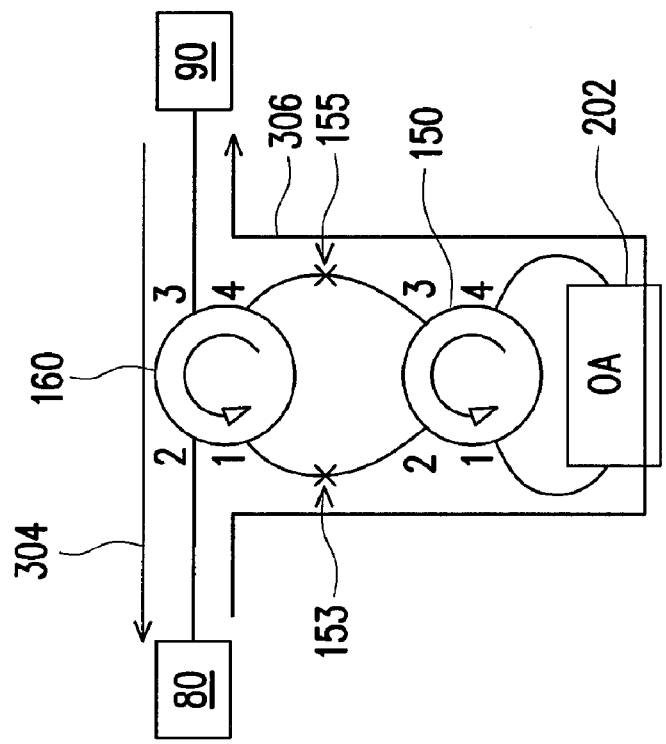

Referring to FIG. 7C, another variation is based on the settings illustrated in FIG. 6B. Accordingly, the reversible optical circulator 150 is set to backward circulation, but the reversible optical circulator 160 is set to forward circulation. Thus, the optical signal is transmitted from the communication node 80 to the communication node 90 via the path 300 without being passed through the reversible optical circulator 150. The optical signal is transmitted from the communication node 90 to the communication node 80 via the path 302, and the optical signal passes through the reversible optical circulator 150 but is not amplified by the optical gain device 202.

Figure 7D:
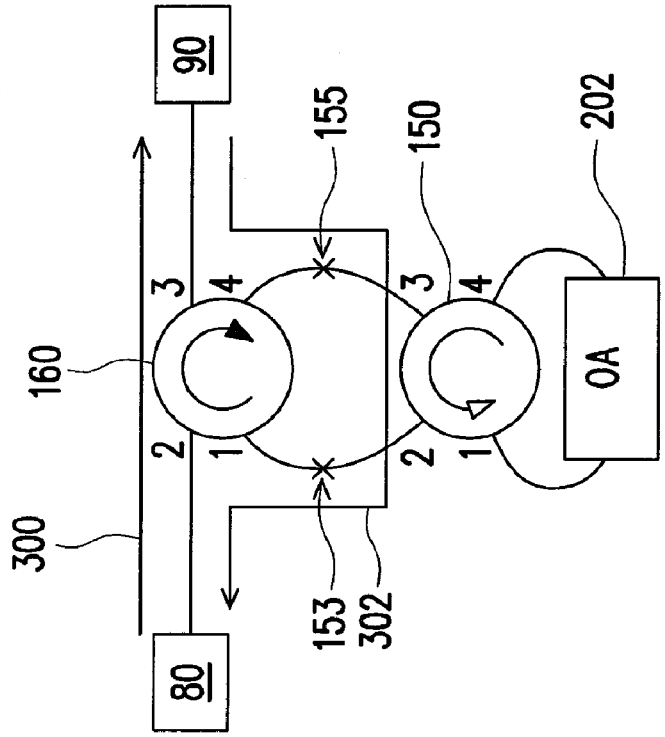

Referring to FIG. 7D, both the reversible optical circulator 150 and the reversible optical circulator 160 are set to backward circulation. Thus, the optical signal is transmitted from the communication node 90 to the communication node 80 via the path 304 without being passed through the reversible optical circulator 150. The optical signal is transmitted from the communication node 80 to the communication node 90 via the path 306, and the optical signal passes through the reversible optical circulator 150 and is amplified by the optical gain device 202.

In the embodiment illustrated in FIGS. 7A-7D, the optical signal can be transmitted bi-directionally at the same time. However, the connections of the reversible optical circulator 150 and the reversible optical circulator 160 can be simply changed if the optical signal is to be transmitted unidirectionally according to the actual requirement.

Figure 8A:
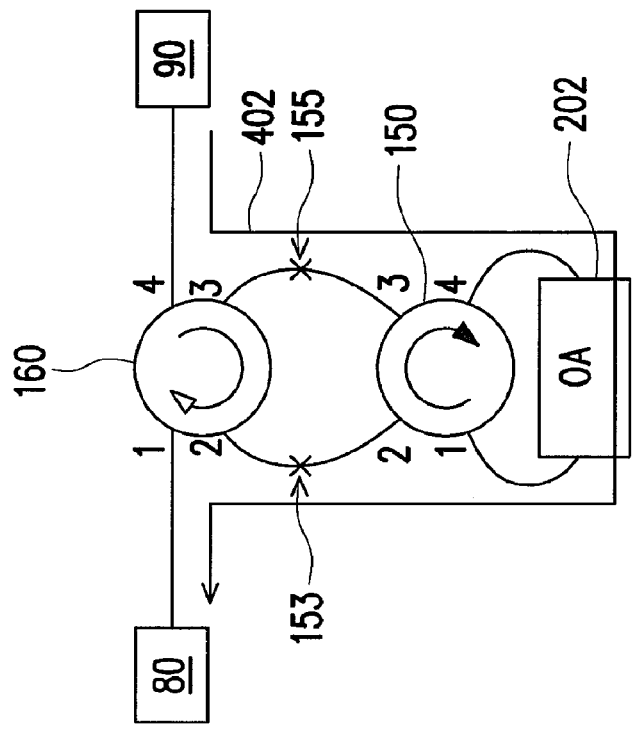
FIGS. 8A-8D are diagrams illustrating examples of different operations according to yet another exemplary embodiment consistent with the present invention.

FIGS. 8A-8D are diagrams illustrating examples of different operations according to yet another embodiment of the present invention. Referring to FIG. 8A, the second terminal (2) and the third terminal (3) of the reversible optical circulator 150 are respectively connected to the second terminal (2) and the third terminal (3) of the reversible optical circulator 160. The first terminal (1) and the fourth terminal (4) of the reversible optical circulator 160 are respectively connected to the communication node 80 and the communication node 90. The reversible optical circulator 150 is set to the forward circulation, and the reversible optical circulator 160 is set to the forward circulation. Thus, the optical signal is transmitted from the communication node 80 to the communication node 90 via a path 400, and the optical signal passes through the reversible optical circulator 150 but is not amplified by the optical gain device 202. Besides, the optical signal transmitted from the communication node 90 to the communication node 80 enters the fourth terminal (4) of the reversible optical circulator 160; however, since the fourth terminal (4) is isolated from the first terminal (1), the optical signal is only transmitted unidirectionally.

Figure 8B:
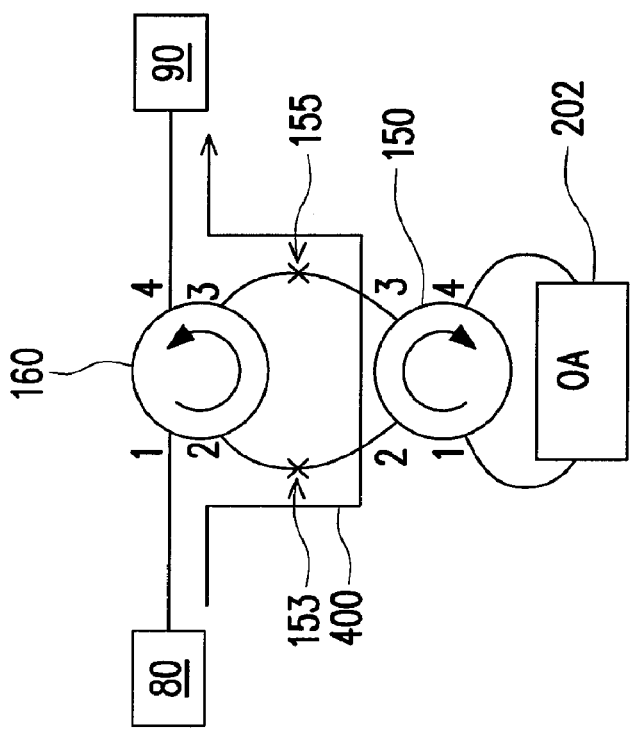

Referring to FIG. 8B, different from FIG. 8A, the reversible optical circulator 150 is in forward circulation and the reversible optical circulator 160 is in backward circulation. Thus, the optical signal cannot be transmitted from the communication node 80 to the communication node 90 so that only a unidirectional transmission is accomplished. Besides, the optical signal transmitted from the communication node 90 to the communication node 80 via a path 402 passes through the reversible optical circulator 150 and amplified by the optical gain device 202.

Figure 8C:
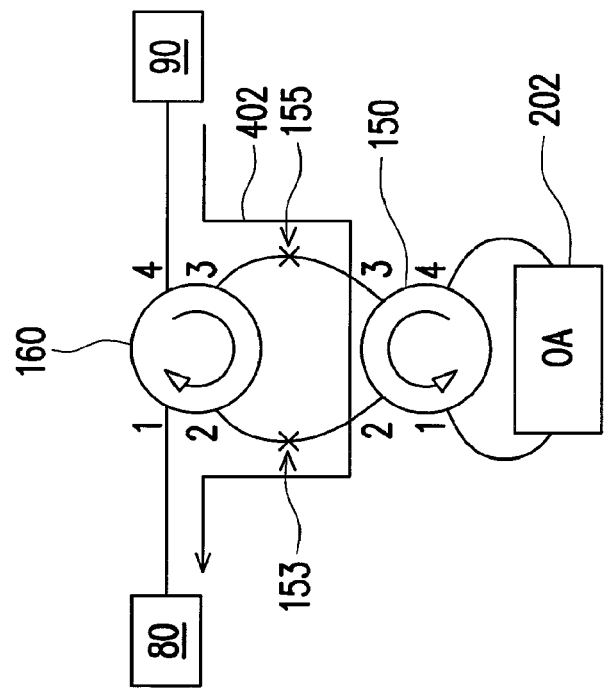

Referring to FIG. 8C, different from FIG. 8A, the reversible optical circulator 150 is in backward circulation and the reversible optical circulator 160 is in forward circulation. Thus, the optical signal is transmitted from the communication node 80 to the communication node 90 via the path 400, and the optical signal passes through the reversible optical circulator 150 and amplified by the optical gain device 202. Besides, the optical signal cannot be transmitted from the communication node 90 to the communication node 80.

Figure 8D:
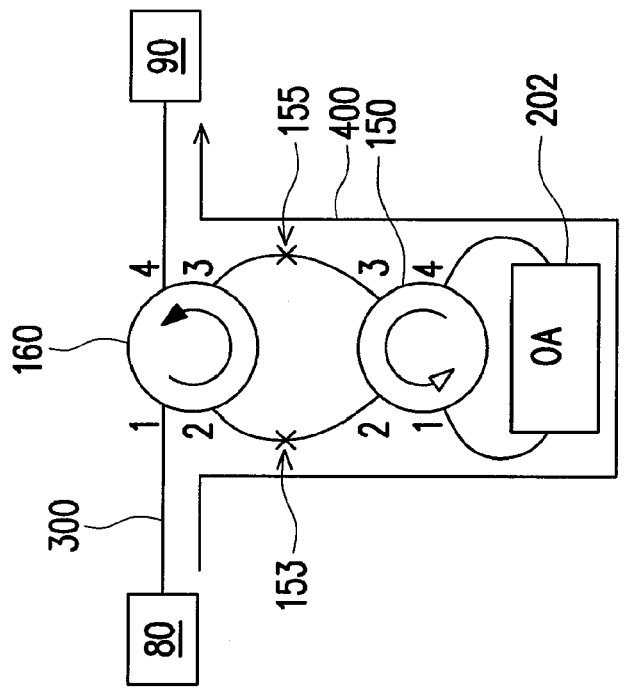

Referring to FIG. 8D, different from FIG. 8A, both the reversible optical circulator 150 and the reversible optical circulator 160 are in backward circulation. Thus, the optical signal cannot be transmitted from the communication node 80 to the communication node 90 so that a unidirectional transmission is accomplished. The optical signal is transmitted from the communication node 90 to the communication node 80 via the path 402, and the optical signal passes through the reversible optical circulator 150 but not amplified by the optical gain device 202.

Similarly, more reversible optical circulators can be adopted according to the actual requirement.

Figure 9:
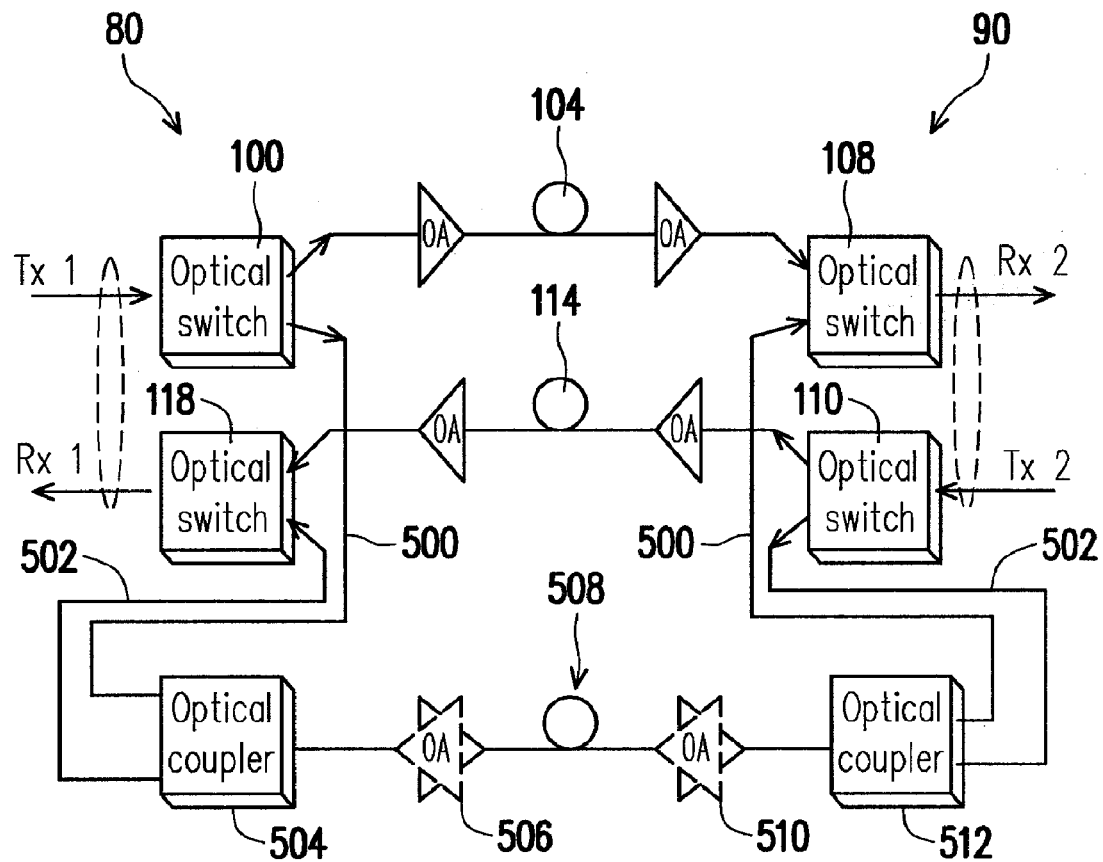
FIG. 9 is a schematic diagram of an optical signal transmission system according to an exemplary embodiment consistent with the present invention.

The reconfigurable optical amplifier described above can be applied in an actual optical signal transmission system. Besides being directly disposed between two communication nodes, the reconfigurable optical amplifier in the present invention may also be used for replacing a conventional protection path. FIG. 9 is a diagram of an optical signal transmission system according to an embodiment of the present invention. Referring to FIG. 9, the optical signal transmission system is for transmitting an optical signal between two communication nodes 80 and 90. The communication node 80 has optical switches 100 and 118 connected to a transmitter Tx1 and a receiver Rx1. The optical switches 100 and 118 form an optical switch unit which is used for switching an optical path to a protection path 508. The communication node 90 has optical switches 108 and 110 connected to a receiver Rx2 and a transmitter Tx2. The optical switches 108 and 110 form an optical switch unit which is used for switching an optical path to the protection path 508. An optical path 104 is connected between the transmitter Tx1 and the receiver Rx2 through the optical switches 100 and 108. An optical path 114 is connected between the receiver Rx1 and the transmitter Tx2 through the optical switches 118 and 110. The protection path 508 is connected to the paths 502 and 500 via the optical couplers 504 and 512 through the switching of the optical switches 100, 108, 110, and 118. The protection path 508 includes at least one reconfigurable optical amplifier. For example, the protection path 508 includes two reconfigurable optical amplifiers 506 and 510. The reconfigurable optical amplifiers 506 and 510 have the structure and mechanism as described above. Thereby, the protection path 508 is simplified into an optical amplifying path with switchable transmission directions. As a result, the cost of the protection path 508 is reduced.

A protected system structure is to preserve a protection path in the entire system. If an error occurs in the system, the system can automatically determines the error and switches the protection path to an uplink path or a downlink path in order to ensure the stability of the entire system. The important components of the protection path include optical switches and reconfigurable optical amplifiers. When a central terminal transmits a data to a user terminal through an optical fiber downlink path and an error occurs on the downlink path, a monitoring device detects the error and changes the amplification direction of the optical switches and the reconfigurable optical amplifiers to turn the protection path into a downlink path. When a user terminal transmits a data to a central terminal through an optical fiber uplink path and an error occurs on the uplink path, the monitoring device detects the error and changes the amplification direction of the optical switches and the reconfigurable optical amplifiers to turn the protection path into an uplink path. If an error occurs on an optical fiber network, the network connection can be instantly switched to the protection path so that the network connection can be retained anytime and the cost of the network can be greatly reduced.

The reversible optical circulator provided by the present invention can be applied to a device with reversible optical transmission direction, wherein the optical transmission direction can be switched in the device, and the device can be applied to an optical fiber network system as an important device for protecting the network system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reconfigurable optical amplifier, comprising:
a first reversible optical circulator, having four I/O ports which are respectively a first terminal, a second terminal, a third terminal, and a fourth terminal, wherein the first terminal, the second terminal, the third terminal, and the fourth terminal sequentially transmit a first optical signal in a first transmission direction of a forward circulation or a backward circulation according to a control signal, and the first terminal is isolated from the adjacent fourth terminal; and
an optical gain device, connected between the first terminal and the adjacent fourth terminal,
wherein the second terminal and the third terminal are respectively connected to a first communication node and a second communication node.

2. The reconfigurable optical amplifier according to claim 1, wherein the first terminal and the adjacent fourth terminal are connected through the optical gain device, and the optical gain device produces an optical signal gain to the first optical signal which forwardly or backwardly passes through the optical gain device.

3. The reconfigurable optical amplifier according to claim 1, wherein the first reversible optical circulator comprises:
an optical circulator, having the four I/O ports, wherein an internal magnetic unit of the optical circulator is made of a semi-hard magnetic material; and
a magnetic field control device, for generating a first direction magnetic field or a second direction magnetic field according to the control signal and supplying the first direction magnetic field or the second direction magnetic field to the optical circulator to change a magnetic polarity, so that the first terminal, the second terminal, the third terminal, and the fourth terminal sequentially transmit the first optical signal in the first transmission direction of the forward circulation or the backward circulation.

4. The reconfigurable optical amplifier according to claim 1, wherein when the first optical signal which is not to be amplified is transmitted between the first communication node and the second communication node, the control signal controls the first transmission direction of the first reversible optical circulator to transmit the first optical signal between the second terminal and the third terminal.

5. The reconfigurable optical amplifier according to claim 1, wherein when the first optical signal which is to be amplified is transmitted between the first communication node and the second communication node, the control signal controls the first transmission direction of the first reversible optical circulator to transmit the first optical signal between the first terminal and the fourth terminal through the optical gain device.

6. The reconfigurable optical amplifier according to claim 1 further comprising a second reversible optical circulator, wherein the second reversible optical circulator has four I/O ports which are respectively a fifth terminal, a sixth terminal, a seventh terminal, and an eighth terminal, the fifth terminal, the sixth terminal, the seventh terminal, and the eighth terminal sequentially transmit a second optical signal in a second transmission direction of the forward circulation or the backward circulation according to a control signal, and the fifth terminal is isolated from the adjacent eighth terminal,
wherein the first reversible optical circulator and the second reversible optical circulator are connected by respectively connecting the fifth terminal and the eighth terminal to the first communication node and the second communication node and respectively connecting the sixth terminal and the seventh terminal to a third communication node and a fourth communication node.

7. The reconfigurable optical amplifier according to claim 6, wherein the first reversible optical circulator and the second reversible optical circulator are both the forward circulation or the backward circulation so that the second optical signal of the second reversible optical circulator is transmitted and amplified through the first reversible optical circulator and the optical gain device between the fifth terminal and the adjacent eighth terminal.

8. The reconfigurable optical amplifier according to claim 6, wherein the first reversible optical circulator and the second reversible optical circulator are respectively the forward circulation and the backward circulation or respectively the backward circulation and the forward circulation so that the second optical signal of the second reversible optical circulator is transmitted through the first reversible optical circulator but not the optical gain device between the fifth terminal and the adjacent eighth terminal.

9. The reconfigurable optical amplifier according to claim 1 further comprising a second reversible optical circulator, wherein the second reversible optical circulator has four I/O ports which are respectively a fifth terminal, a sixth terminal, a seventh terminal, and an eighth terminal, the fifth terminal, the sixth terminal, the seventh terminal, and the eighth terminal sequentially transmit a second optical signal in a second transmission direction of the forward circulation or the backward circulation according to a control signal, and the fifth terminal is isolated from the adjacent eighth terminal,
wherein the first reversible optical circulator and the second reversible optical circulator are connected by respectively connecting the sixth terminal and the seventh terminal to the first communication node and the second communication node and respectively connecting the fifth terminal and the eighth terminal to a third communication node and a fourth communication node.

10. The reconfigurable optical amplifier according to claim 9, wherein the first reversible optical circulator and the second reversible optical circulator are both the forward circulation or the backward circulation so that the second optical signal of the second reversible optical circulator is transmitted through the first reversible optical circulator but not the optical gain device.

11. The reconfigurable optical amplifier according to claim 9, wherein the first reversible optical circulator and the second reversible optical circulator are respectively the forward circulation and the backward circulation or respectively the backward circulation and the forward circulation so that the second optical signal of the second reversible optical circulator is transmitted through the first reversible optical circulator and transmitted and amplified through the optical gain device.

12. A reversible optical circulator, comprising:
an optical circulator, having four I/O ports which are respectively a first terminal, a second terminal, a third terminal, and a fourth terminal, wherein an internal magnetic unit of the optical circulator is made of a semi-hard magnetic material; and
a magnetic field control device, for generating a first direction magnetic field or a second direction magnetic field according to a control signal, and supplying the first direction magnetic field or the second direction magnetic field to the optical circulator to change a magnetic polarity, so that the first terminal, the second terminal, the third terminal, and the fourth terminal sequentially transmit an optical signal in a transmission direction of a forward circulation or a backward circulation, wherein the first terminal is isolated from the fourth terminal.

13. The reversible optical circulator according to claim 12, wherein the first terminal and the fourth terminal are respectively connected to a first communication node and a second communication node.

14. An optical signal transmission system, comprising:
a first communication terminal, having a first optical switch unit connected to a first receiver and a first transmitter;
a second communication terminal, having a second optical switch unit connected to a second receiver and a second transmitter;
an optical first path, connected between the first receiver and the second transmitter through the first optical switch unit and the second optical switch unit;
an optical second path, connected between the first transmitter and the second receiver through the first optical switch unit and the second optical switch unit; and
a protection path, connected between the first receiver and the second transmitter or between the second receiver and the first transmitter through the first optical switch unit and the second optical switch unit, wherein the protection path comprises at least one reconfigurable optical amplifier, and the reconfigurable optical amplifier comprises:
a first reversible optical circulator, having four I/O ports which are respectively a first terminal, a second terminal, a third terminal, and a fourth terminal, wherein the first terminal, the second terminal, the third terminal, and the fourth terminal sequentially transmit a first optical signal in a first transmission direction of a forward circulation or a backward circulation according to a control signal, and the first terminal is isolated from the adjacent fourth terminal; and
an optical gain device, connected between the first terminal and the adjacent fourth terminal, wherein the second terminal and the third terminal are respectively connected to a first node and a second node, and the first node and the second node are respectively connected to the first communication terminal and the second communication terminal either directly or through a second reversible optical circulator.

15. The optical signal transmission system according to claim 14, wherein the first terminal and the adjacent fourth terminal are connected through the optical gain device, and the optical gain device produces an optical signal gain to the first optical signal which forwardly or backwardly passes through the optical gain device.

16. The optical signal transmission system according to claim 14, wherein the reversible optical circulator comprises:
an optical circulator, having the four I/O ports, wherein an internal magnetic unit of the optical circulator is made of a semi-hard magnetic material; and
a magnetic field control device, for generating a first direction magnetic field or a second direction magnetic field according to the control signal, and supplying the first direction magnetic field or the second direction magnetic field to the optical circulator to change a magnetic polarity, so that the first terminal, the second terminal, the third terminal, and the fourth terminal sequentially transmit the first optical signal in the first transmission direction of the forward circulation or the backward circulation.

17. The optical signal transmission system according to claim 14, wherein when the first optical signal which is not to be amplified is transmitted between the first node and the second node of the first reversible optical circulator, the control signal controls the first transmission direction of the first reversible optical circulator to transmit the first optical signal between the second terminal and the third terminal.

18. The optical signal transmission system according to claim 14, wherein when the first optical signal which is to be amplified is transmitted between the first node and the second node of the first reversible optical circulator, the control signal controls the first transmission direction of the first reversible optical circulator to transmit the first optical signal between the first terminal and the fourth terminal through the optical gain device.

19. The optical signal transmission system according to claim 14, wherein the second reversible optical circulator has four I/O ports which are respectively a fifth terminal, a sixth terminal, a seventh terminal, and an eighth terminal, the fifth terminal, the sixth terminal, the seventh terminal, and the eighth terminal sequentially transmit a second optical signal in a second transmission direction of the forward circulation or the backward circulation according to a control signal, and the fifth terminal is isolated from the adjacent eighth terminal,
wherein the first reversible optical circulator and the second reversible optical circulator are connected by respectively connecting the fifth terminal and the eighth terminal to the first node and the second node and respectively connecting the sixth terminal and the seventh terminal to the first communication terminal and the second communication terminal;
or the first reversible optical circulator and the second reversible optical circulator are connected by respectively connecting the sixth terminal and the seventh terminal to the first node and the second node and respectively connecting the fifth terminal and the eighth terminal to the first communication terminal and the second communication terminal.

20. The optical signal transmission system according to claim 14, wherein the protection path further comprises a first optical coupler and a second optical coupler, wherein the protection path is connected to the first optical switch unit via the first optical coupler, and connected to the second optical switch unit via the second optical coupler.

* * * * *